US009606365B2

(12) United States Patent
Muller (10) Patent No.: US 9,606,365 B2
(45) Date of Patent: Mar. 28, 2017

(54) MIRROR-BASED READING DEVICE (71) Applicant: Josef Muller, Passaic, NJ (US)

(72) Inventor: Josef Muller, Passaic, NJ (US)

(*) Notice: Subject to any disclaimer, the term of this patent is extended or adjusted under 35 U.S.C. 154(b) by 224 days.

(21) Appl. No.: 14/504,012

(22) Filed: Oct. 1, 2014

(65) Prior Publication Data

US 2015/0098213 A1 Apr. 9, 2015

Related U.S. Application Data (60) Provisional application No. 61/888,038, filed on Oct. 8, 2013, provisional application No. 61/946,474, filed on Feb. 8, 2014.

(51) Int. Cl.
*F21V 33/00* (2006.01)
*G02B 27/02* (2006.01)
*A47B 23/00* (2006.01)
*A47B 23/04* (2006.01)
*A47B 23/06* (2006.01)
*A47B 19/06* (2006.01)

(52) U.S. Cl.
CPC .......... *G02B 27/021* (2013.01); *A47B 23/007* (2013.01); *A47B 23/046* (2013.01); *A47B 23/06* (2013.01); *A47B 19/06* (2013.01)

(58) Field of Classification Search
CPC ...... A47B 23/007; A47B 23/046; A47B 23/06
See application file for complete search history.

(56) References Cited

U.S. PATENT DOCUMENTS 3,790,770 A 2/1974 Stern
4,560,255 A * 12/1985 Reiner ................. G02B 27/021
359/364
(Continued)

FOREIGN PATENT DOCUMENTS

CN 202486805 10/2012
EP 0065734 12/1982
(Continued)

OTHER PUBLICATIONS

International Preliminary Report on Patentability dated Apr. 21, 2016 issued in corresponding International patent application No. PCT/US 2014/058832.
(Continued)

*Primary Examiner* — Evan Dzierzynski
(74) *Attorney, Agent, or Firm* — Ostrolenk Faber LLP (57) ABSTRACT

A reading apparatus for assisting a person to read or view reading material, including from a lying down position, with the reading apparatus including in a lying down position. The reading apparatus comprises: an optical system including a tray for supporting the reading material, a reflecting mirror and an imaging mirror, said tray, said reflecting mirror and said imaging mirror being mechanically intercoupled in a manner that enables them to be positioned at predetermined, respective angles relative to each other, to enable the reading material located on said tray to be viewed by viewing an image formed by said imaging mirror. A support is configured to enable the optical system to be positioned in front of the person. The tray, the reflecting mirror and the imaging mirror can be folded onto each other.

21 Claims, 5 Drawing Sheets

(56) References Cited

U.S. PATENT DOCUMENTS

| | | | | |
|---|---|---|---|---|
| 4,930,884 A | * | 6/1990 | Tichenor | G02B 27/04 |
| | | | | 359/857 |
| 5,195,714 A | * | 3/1993 | Stewart | A47B 23/02 |
| | | | | 248/448 |
| 5,471,264 A | | 11/1995 | Hsia et al. | |
| 5,997,147 A | * | 12/1999 | Tatoian | A47B 23/007 |
| | | | | 359/856 |
| 6,059,417 A | * | 5/2000 | Tatoian | A47B 23/007 |
| | | | | 248/480 |
| 6,637,714 B1 | * | 10/2003 | Hall | A47B 23/007 |
| | | | | 248/444.1 |
| 8,416,513 B1 | * | 4/2013 | McPherson | G02B 25/002 |
| | | | | 248/444 |
| 2006/0072328 A1 | * | 4/2006 | Chan | F21V 21/22 |
| | | | | 362/382 |

FOREIGN PATENT DOCUMENTS

| | | |
|---|---|---|
| EP | 1462028 | 9/2004 |
| NL | 38359 | 6/1936 |
| NL | 8800470 | 9/1989 |

OTHER PUBLICATIONS

International Search Report dated Jan. 22, 2015 issued in corresponding International patent application No. PCT/US 2014/058832.
Written Opinion dated Jan. 22, 2015 issued in corresponding International patent application No. PCT/US 2014/058832.

* cited by examiner

MIRROR-BASED READING DEVICE

CROSS-REFERENCE TO RELATED APPLICATION

This application claims benefit of and priority to U.S. Provisional Application Ser. No. 61/888,038 filed Oct. 8, 2013 and U.S. Provisional Application Ser. No. 61/946,474 filed Feb. 8, 2014, the contents of which are incorporated herein by reference.

BACKGROUND OF THE INVENTION

The present invention relates to an apparatus to facilitate the reading of a book or the like by a person who is reading in a supine or seating position with limited hand/body movability.

Apparatus for facilitating reading, including by bed ridden and paralyzed persons have been described in the prior art, including in U.S. Pat. Nos. 4,531,813; 5,471,264; 6,672,556; 3,926,509; 4,759,621, and 5,087,116. The contents of the aforementioned patents are incorporated by reference herein in their entireties.

The prior art products have the same problem as prism glasses. No one wants to use them because the user becomes disoriented while using this system, within a matter of seconds and maybe minutes at most. The reason is very simple. When a person looks into the mirror, he sees the entire room behind him upside down, which makes it literally intolerable. The mirrors system of this invention is sized so that a person sees a defined area only.

There are known devices that help users to read in bed, but none of the known devices has multiple functions and they are all very bulky and take up a lot of room. By using the unique mirror setup of this invention the limitations of prior known devices have been overcome.

SUMMARY OF THE INVENTION

As noted, the general objective of the present invention is to provide an apparatus that helps the user to read a book or view a computer, etc., while being in a lying down, semi-sitting or sitting position. This invention also can be used as an over-bed table, a makeup mirror and a lectern. While using this invention, users see enlarged text so it helps reading a book by visually impaired and immobile persons.

Also, reading a book is quite difficult for a paralyzed or certain bedridden persons, whereby the invention enables a person to read a book without holding it. The book can be angled and positioned for comfortable reading, A magnifying mirror and installed illumination makes reading enjoyable.

This invention accommodates other user needs. One of the setups is a makeup mirror, where the user can adjust the device to have a regular mirror in front of her and a tray. Another setup is an over-bed table. When folded down, this device can be used as a regular hospital, over-bed table. This invention also can be used as a lectern when it is fully unfolded.

This device is very compact and versatile. Preferably, it is designed in such way that it will not take more space than a regular hospital over-bed table hence it can be used in hospitals and make hospital stays less painful. Since the device is on wheels, it can be easily moved about for convenience, and in case of an emergency.

An overall objective of the system of this invention is to enable a person who is bedridden, with limited manual dexterity, to: (a) to turn book and other pages by himself; (b) Write; and (c) Use an iPad® or similar device and see his fingers moving and which buttons he is pressing while working.

Primarily, the system of the present invention: (a) allows a person to have the book fully within the reach of his hands, so he can turn pages; (b) allows use of hands to write a letter while the person is in a supine position (without having all you book run out of his hands); (c) Use an iPad® or similar device and see his fingers moving and which buttons he is pressing while working; and (d) for any purpose whatsoever, e.g. eating, viewing photos, and the like.

In addition, the system of this invention: (a) allows for the patient/user to use the device in both (1) half-lying position; and (2) fully-lying position; (b) allows for the person to sit up so he can continue to use the tray and rotate the mirror functions out of his way; and (c) unlike the prior art products which are a big obstacle in a hospital or anywhere else, the product of this invention is designed to be folded away and take up no room at all. That is, the apparatus folds together, including the tray, upper mirror and viewing mirror.

Additional features include: (a) lighting built into the device; and (b) the system of this invention being wall mounted; bed mounted; or free standing.

The foregoing and other objects of the invention are realized in accordance with a preferred embodiment of the invention in a form of a reading apparatus for assisting a person to read or view reading material, including from a lying down position, the reading apparatus comprising: an optical system including a tray for supporting the reading material, a reflecting mirror and an imaging mirror, said tray, said reflecting mirror and said imaging mirror being mechanically intercoupled in a manner that enables them to be positioned at predetermined, respective angles relative to each other, to enable the reading material located on said tray to be viewed by viewing an image formed by said imaging mirror; a support that is configured to enable the optical system to be positioned in front of the person; and wherein said tray, said reflecting mirror and said imaging mirror can be folded onto each other. Preferably, each of the tray, the reflecting mirror and the imaging mirror lies in its respective plane in an operative position of the optical system and the planes intersect one another. The planes may intersect at acute angles.

In accordance with one embodiment, the reflecting mirror is located in front of the imaging mirror, relative to the person and the image formed by the imaging mirror is viewable through the reflecting mirror. The reflecting mirror may be a two-way mirror.

The reading apparatus may include a lighting system located in a space defined between the tray, the reflecting mirror, and the imaging mirror. The imaging mirror may be a magnifying mirror, preferably a convex mirror. The tray, the reflecting mirror and the imaging mirror may be foldable into a table with a top table surface which is defined on a support which holds the imaging mirror. The support may further define a tabletop adjacent the optical system and the optical system is foldable to form an additional tabletop, which is coextensive with the tabletop which is part of the support.

The lighting system is preferably located on a support that enables the lighting system to be moved to illuminate an area outside of the space between the tray and the two mirrors. The lighting system may comprise battery operated LED lamps.

The support for the optical system may be configured as a hospital table cart, which has a base, an upright and a horizontally extending upper support, whereby the base can be slid under a bed and the horizontally extending upper support over the bed of the person. The optical system may be supported on the upper support on a sliding mechanism and/or may be rotatable on the upper support, whereby the optical system can be used by a patient sitting in a chair next to a hospital bed. The reading apparatus may also be useable as a general purpose tabletop or as a lectern or as a makeup mirror and the like. A shade may be provided in front of the optical system to block ambient light from shining on the rear surface of a reflecting mirror through which the image on the imaging mirror is viewed.

Other features and advantages of the present invention will become apparent from the following description of the invention which refers to the accompanying drawings.

DETAILED DESCRIPTION OF THE DRAWINGS

Figure 1:
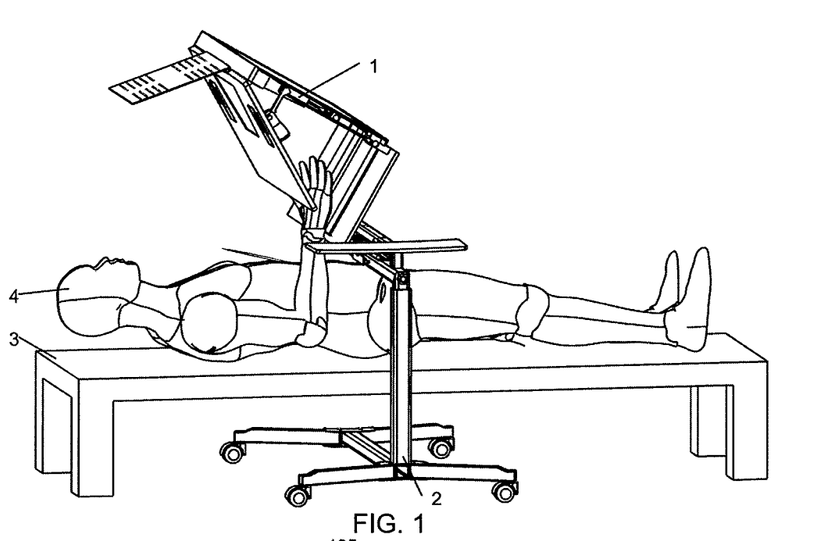
FIG. 1 shows a basic setting for reading in the lying position.

As shown in FIG. 1, when the person 4 is confined to a bed 3 this invention assists in book reading and general object viewing. The main device consists of a stand 2 and optics box 1.

Figure 2:
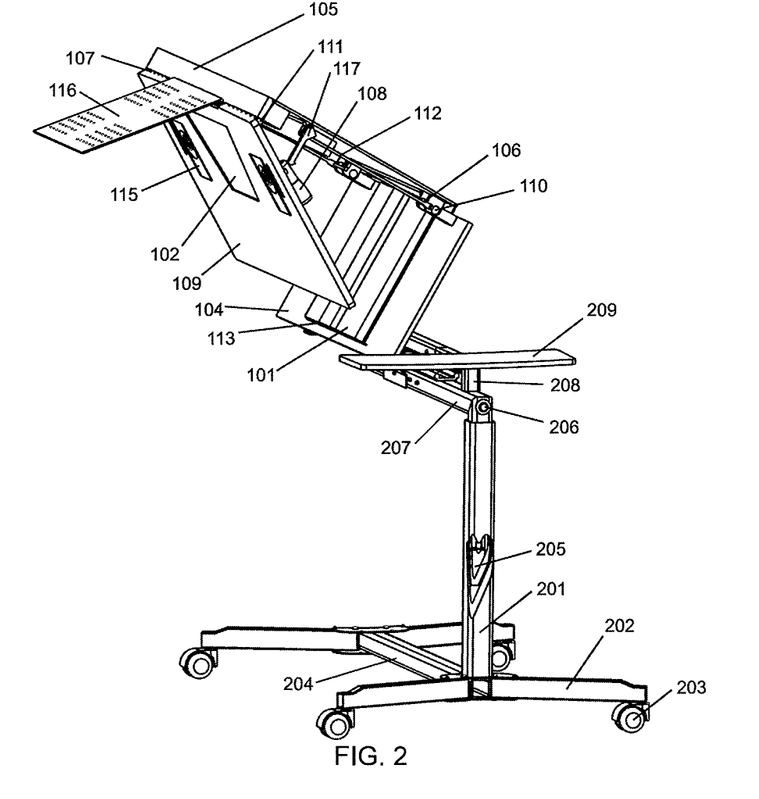
FIG. 2 shows the invention in use.

Referring to FIG. 2, the stand 2 has four wheels 203 that allow easy maneuvering. For improved stability, wheels 203 are attached to four legs 202, which are attached to a horizontal support bar 204. By pressing snap button 215 (FIG. 3), legs 202 can be rotated around pin 214 (FIG. 3) and folded next to a horizontal bar 204, so the whole device will take less room when not in use. Vertical pole 201 is attached to a horizontal support bar 204 as well. On the vertical pole 201 is mounted an "L" shaped cantilever 207 which allows height adjustments. Vertical adjustments are assisted by the gas spring 205 which is activated by pressing the release button 206. Gas spring 205 is sized in such way that the user does not feel the weight of the optics box during vertical adjustments. The cantilever 207 has an integrated sliding mechanism 210 (FIG. 3) that allows positioning of the optics box in the horizontal direction.

FIG. 2 also shows a coffee table 209 with its support 208. If needed, support 208 can be detached from the optics box support 211 and attached on the opposite side of the optics box to accommodate for left handed operation.

Figure 3:
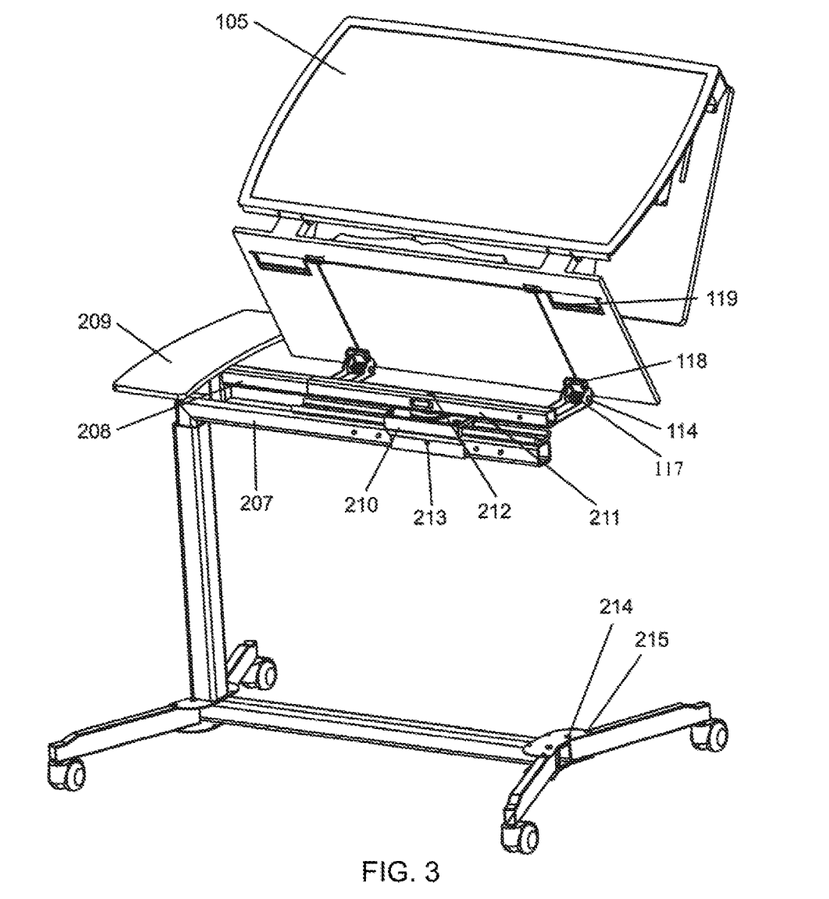
FIG. 3 is a back view of the invention and of the connection between the stand and the optics box.

FIG. 3 shows the back side of the optics box. Here can be seen that the optics box is attached to its support 211 by way of two hinges 114. To be able to adjust an angle of the optics box, there is locking mechanism that comprises a release lever 119 and locking pin 118. A user can adjust this angle from zero (horizontal) to 60°. For user convenience, hinges 114 comprise springs 117 loaded to reduce the weight of the optics box. If needed, the optics box can be rotated around its vertical axis 212 and it can be moved on the horizontal slide 210 by pressing the release button 213.

Figure 5:
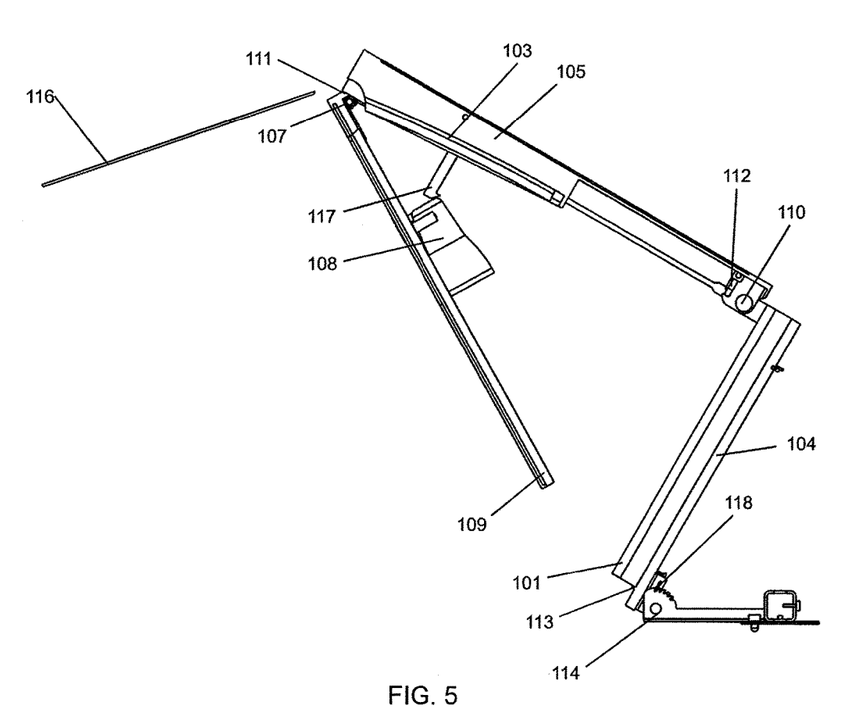
FIG. 5 is a cross-section of the optics box.

In the cross section of the optics box (FIG. 5) can be seen basic components. Book 101 is placed on the book tray 104. To make sure that book 101 does not fall from book tray 104, book support 113 is added. The support may include a clamp (not shown) to hold the book open at any page. Spring loaded hinges 110 (one on each side of the optics box) holds table 105 in perpendicular position against book tray 104. Table 105 is attached to a book tray 104 by way of hinge 110. Spring 106 (see FIG. 2) installed at the hinge 110 acts as a counterbalance for the table 105. The locking mechanism 112 holds table 105 with concave mirror 103 in the fixed position against tray 104. Two way mirror 102 is mounted in the frame 109 which is attached to a table 105, by two spring loaded hinges 111. Torsion springs 111 (one on each side of the optics box) are used to hold the two way mirror frame 109 at the right position. Two LED spotlights 108 are installed inside the optics box, one on each side of the box. Spot lights 108 are adjusted in such a way that they illuminate the book 101. Since LED spotlights 108 are mounted on the rotatable supports 115 (FIG. 2), the user can use the same optics box lights as a makeup mirror (see FIG. 7). To make reading more enjoyable, shade 116 is installed. This shade 116 will reduce the glare of the bright light in the room.

Figure 4:
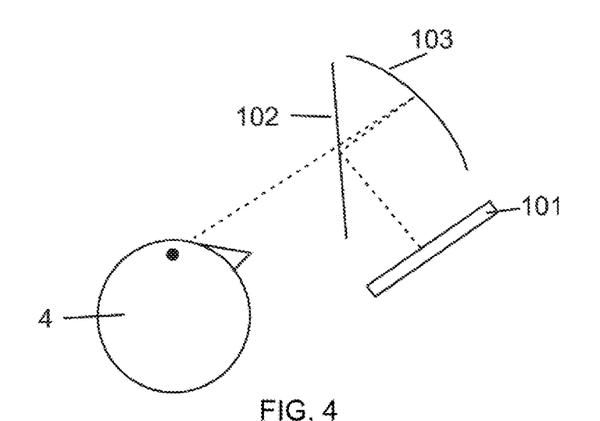
FIG. 4 explains a concept of the invention.

FIG. 4 also illustrates the concept behind this invention. The book 101 is reflected in the two-way mirror 102. From the two-way mirror 102 the image is reflected and magnified by the concave mirror 103. Since the interior of the optics box is brighter than the exterior, user 4 is able to see through the two-way mirror 102 and is able to see the reflection provided by the concave mirror 103. Concave mirror 103 has a magnification large enough for the user to see the book 101 slightly enlarged. Distances and angles between book 101 and the concave mirror 103, and concave mirror 103 and two-way mirror 102 are adjusted so that user 4 can see the entire page(s) of the book 101. Note that each of the book platform, the mirror 102 and the mirror 103 lies in its respective main plane and that these planes, if extended, intersect, preferably at acute angles.

Figure 6:
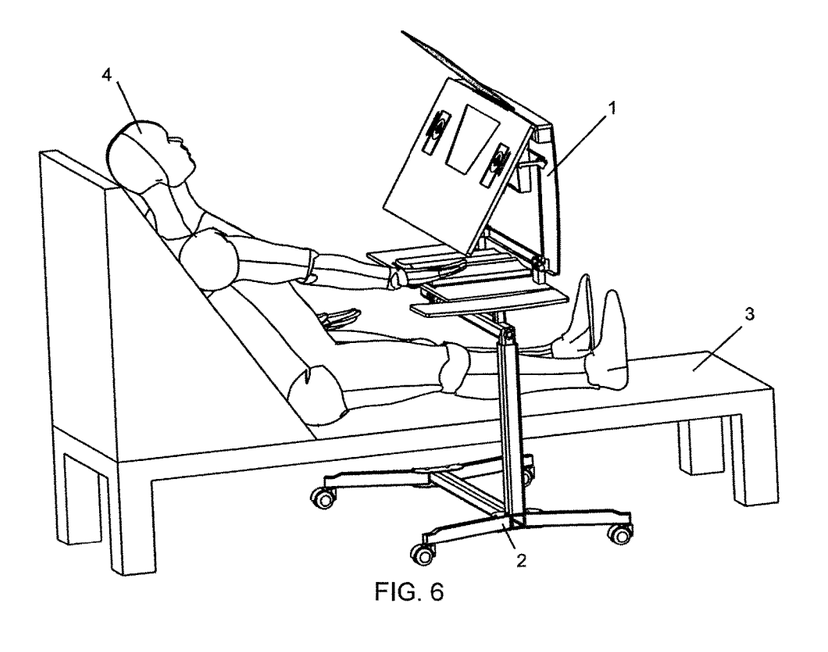
FIG. 6 is a view of the invention adjusted for the reading in a semi-sitting position.

If user 4 wants to read in a semi-sitting position, the stand 2 can be adjusted by height to accommodate this position. Optics box 1 can be adjusted by angle as needed.

Figure 7:
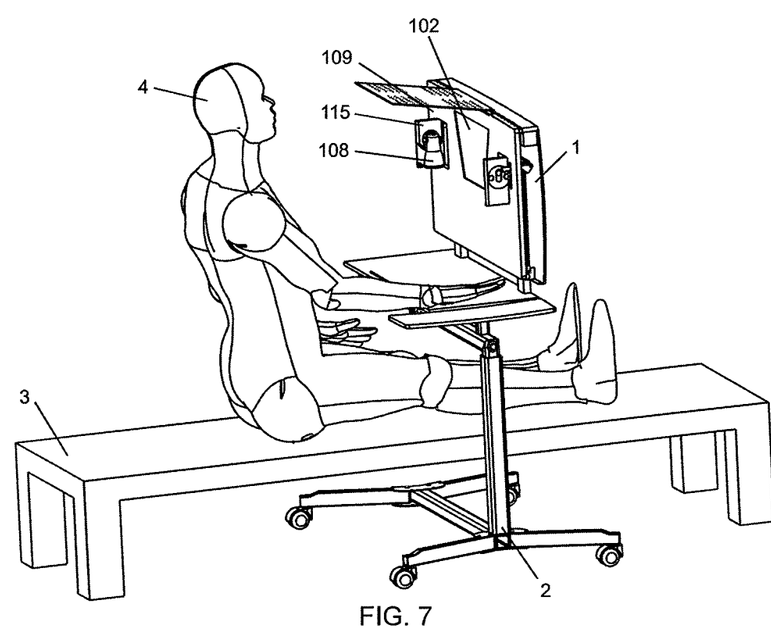
FIG. 7 is a view of the invention adjusted for the reading in a sitting position or as a makeup mirror.

Referring to FIG. 7, if the user 4 wants to read a book in a sitting position (or if one wants to use the mirror for makeup), two-way mirror frame 109 is folded in (closed) and the LED spotlights 108 are turned out on their rotatable supports 115. Because the lights are outside the optics box 1, two-way mirror 102 acts like a regular mirror.

Figure 8:
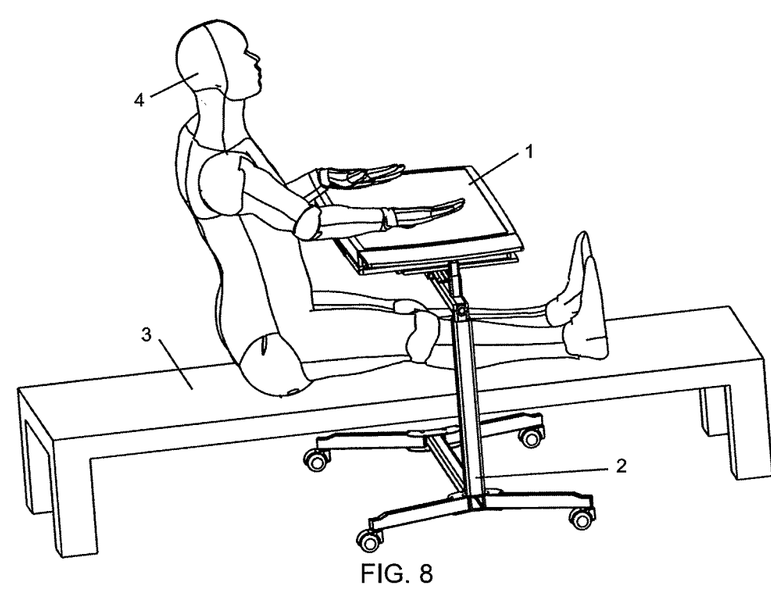
FIG. 8 is a view of the invention folded down completely, as over a bed table.

As shown in the FIG. 8, when completely closed, the optics box 1 can be used as an over-bed table. User 4 can adjust the table angle. It is possible to adjust the height of the stand 2 as needed. The optic box 1 can be flush with the side table 209.

Figure 9:
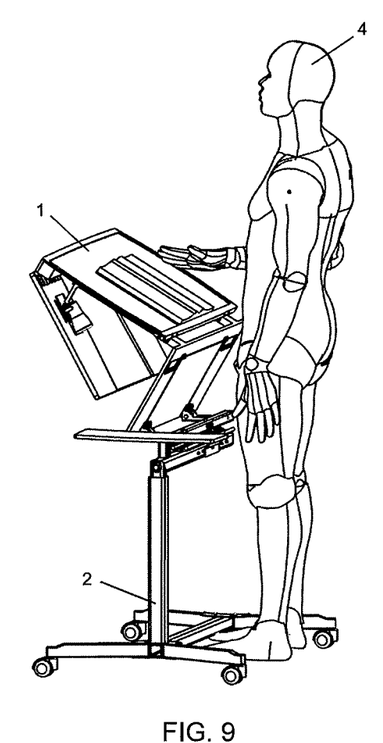
FIG. 9 is a view of the invention adjusted for use as a lectern.

Referring to FIG. 9, by adjusting the height of the stand 2 to accommodate the user's height, optics box 1 can be used as a lectern, with the rear side of the table 105 used to support papers and the like.

Figure 10:
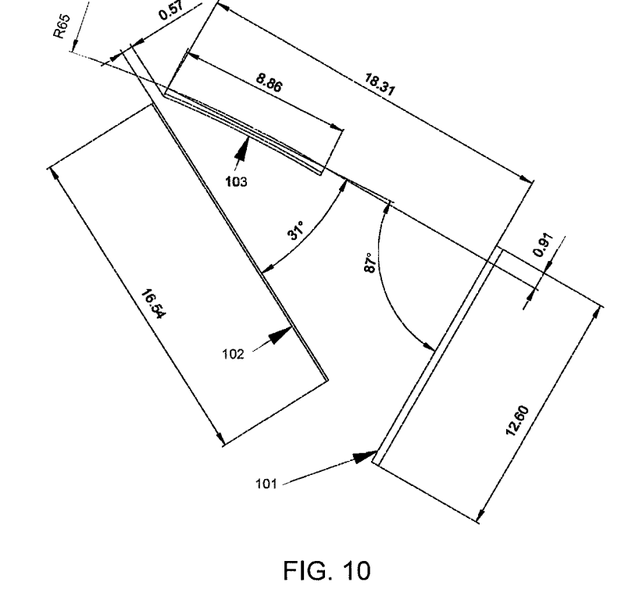
FIG. 10 shows angular relationships between components of the invention.

FIG. 10 shows optional angular and size dimensions (in inches) for the device of the invention.

As can be seen, the patient's hands can easily reach the position of the book to turn pages or to adjust the book on the tray. Reading or viewing of the book or other materials over extended time periods are easily possible, because the book does not have to be supported by hand and the patient does not have to turn on his/her side or lean on his/her arms. Also, the positions of the mirrors and the ledge can preferably be adjusted individually or in tandem in such a way that the leaning position can be adjusted without losing functionality of the system.

Alternate Embodiments and/or Features

The magnifying mirror may have a 2.5× magnification that ensures that reading material is the right size for reading (the user has a feeling that the reading material is closer then it really is).

To ensure that interior of the Box does not get exposed to too much of the ambient light, a black cloth may be provided on both sides of the box. The black cloth may also be placed on the two way mirror to narrow the view so the user can only see the reading material and the tray.

As described above, the purpose of the system is to:

1—Enable and assist an immobile or bedridden or any laying or semi-sitting person to comfortably read and write from a laying or reclining position, and allow for the users to use the book placed in the reading device in both a half-laying (semi-sitting) position and in a fully laying position.

2—Have the book fully within the reach of his/her hands, so he/she can turn a page (thus enabling the user to read and turn the pages by himself).

3—Use one's hands to write a letter while one is in a laying or semi-laying position while having one's hands rest on the tray thus ensuring a more comfortable position while writing.

4—Use an iPad or similar device, and see his/her fingers moving and which buttons he/she is pressing while working.

5—Add additional tray/table space to read/eat while doing any other functions, so the book doesn't get dirty or for any other purpose.

6—Allow for hospital tables to have a built-in reading system as an all-in-one unit (reading, eating, lighting and general table use).

7—Render this product adjusted for the keystone effect.

8—Allow for the person to sit up so he can continue to use the tray while "the box" is folded away. (The optical device will fold away, and the top surface can be used as a regular table, to eat, read and/or for any other purpose.)

Unlike prism glasses and similar products, the system mirrors herein are sized so that the user sees the tray only and the reading material. (The reason people do not like using those products, is because it has been concluded by various experiments that the user become disoriented while using this system within a matter of seconds/minutes. When looking into the mirror the user will see the entire room behind him upside down. This makes it literally intolerable. The system mirrors herein are sized that the user sees the book only.) The product is designed to be folded away and take up no room at all. Light is built into the device.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed:

1. A reading apparatus for assisting a person to read or view a reading material, including in a lying down position, the reading apparatus comprising:

an optical system including a tray for supporting the reading material, a reflecting mirror and an imaging mirror, said tray, said reflecting mirror and said imaging mirror being mechanically intercoupled in a manner that enables them to be positioned at predetermined, respective angles relative to each other, so as to enable an image of the reading material located on said tray to be reflected by said reflecting mirror onto said imaging mirror, to cause a viewable image to be formed by said imaging mirror;

said reflecting mirror having a rear surface, and said reflecting mirror being so located relative to said imaging mirror that the viewable image created by said imaging mirror must pass through a front surface and through said rear surface of said reflecting mirror to reach the eyes of said person;

a support that is configured to enable the optical system to be positioned in front of the person; and wherein said tray, said reflecting mirror and said imaging mirror can be folded relative to each other.

2. The reading apparatus of claim 1, wherein each of said tray, said reflecting mirror and said imaging mirror lies in its respective plane in an operative position of the optical system and said planes intersect one another.

3. The reading apparatus of claim 2, wherein the planes intersect at acute angles.

4. The reading apparatus of claim 1, wherein the reflecting mirror is located in front of the imaging mirror relative to the person and the viewable image formed on the imaging mirror is viewable through the reflecting mirror.

5. The reading apparatus of claim 4, wherein the reflecting mirror is a two-way mirror.

6. The reading apparatus of claim 1, further including a lighting system located in a space defined between the tray, the reflecting mirror, and the imaging mirror.

7. The reading apparatus of claim 6, wherein the lighting system is located on a support that enables the lighting system to be moved to illuminate an area outside of said space.

8. The reading apparatus of claim 6, wherein the lighting system comprises battery operated LED lamps.

9. The reading apparatus of claim 1, wherein the imaging mirror is a magnifying mirror.

10. The reading apparatus of claim 1, wherein the tray, the reflecting mirror and the imaging mirror are foldable into a table with a top surface which is defined on a support which holds the imaging mirror.

11. The reading apparatus of claim 1, wherein the imaging mirror is a convex mirror.

12. The reading apparatus of claim 1, further including a tabletop located adjacent the optical system.

13. The reading apparatus of claim 12, wherein the optical system is foldable to form an additional tabletop which is co extensive with the tabletop.

14. The reading apparatus of claim 1, wherein the support is configured as a hospital table cart.

15. The reading apparatus of claim 14, wherein the hospital table cart support comprises a base, an upright and a horizontally extending upper support.

16. The reading apparatus of claim 15, wherein the optical system is supported on the upper support on a sliding mechanism.

17. The reading apparatus of claim 15, wherein the optical system is rotatably supported on the upper support.

18. The reading apparatus of claim 15, wherein the base is supported on wheels.

19. The reading apparatus of claim 1, wherein the reading apparatus is usable as a general purpose tabletop.

20. The reading apparatus of claim 1, wherein the optical system is foldable to cause the reading apparatus to assume the configuration of a lectern.

21. The reading apparatus of claim 1, further including a shade located to block ambient light from shining on the rear surface of the reflecting mirror.

* * * * *